No. 715,505. Patented Dec. 9, 1902.
H. N. POTTER.
ELECTRIC FURNACE.
(Application filed Nov. 21, 1901.)
(No Model.)
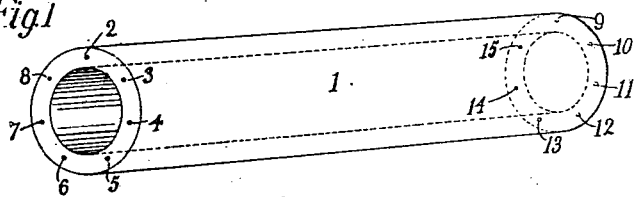
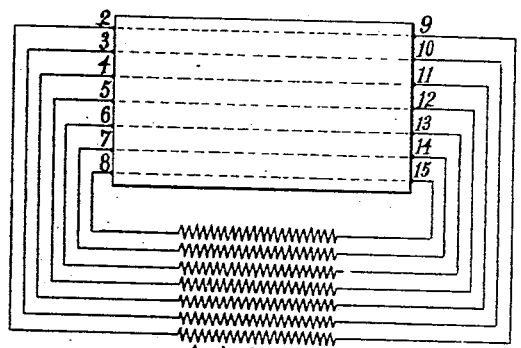
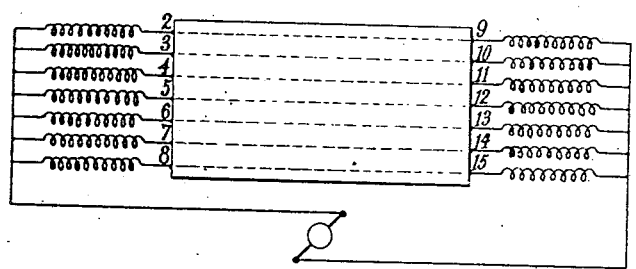
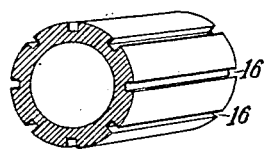 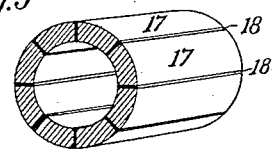
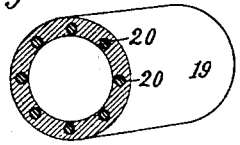 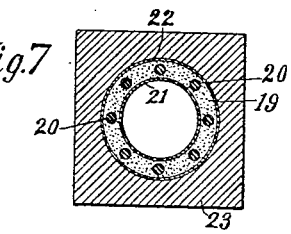
Witnesses:
Raphael Netter
Wm H Capel
Inventor
Henry Noel Potter
by Charles A Terry Atty

UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

ELECTRIC FURNACE.

SPECIFICATION forming part of Letters Patent No. 715,505, dated December 9, 1902.

Application filed November 21, 1901. Serial No. 83,075. (No model.)

*To all whom it may concern:*

Be it known that I, HENRY NOEL POTTER, a citizen of the United States, and a resident of New Rochelle, in the county of Westchester and State of New York, have invented certain new and useful Improvements in Electric Furnaces, of which the following is a specification.

In my Patent No. 652,640, issued to me on June 26, 1900, I show and describe an electric furnace in which the main source of heat is an electrolytic tube composed of a mixture of dry electrolytes and supplied with terminals for conveying electric current to the tube, which is kept in a state of incandescence by the current after a preliminary heating by external means. I also show and describe in the said patent a jacket of some relatively poor conducting material which may be a single one of the components of the tube.

The present invention relates to providing means for preventing the current in such a tube from flowing unevenly by reason of almost unavoidable slight differences in specific resistance of the tube due to structural and perhaps chemical irregularities in the tube material.

In certain embodiments of my invention I provide a plurality of terminals at each end of the conducting-tube, the terminals being arranged in confronting pairs and each pair connected to a separate converter secondary or ballast resistance. The object of such arrangements is to prevent the uneven distribution of current traversing the tube, as stated above. I can also accomplish the desired result by notching the tube or by building up a tube of alternate sections of relatively good and relatively poor conductors, or I may make the main heating portion of the furnace in the form of rods composed of mixed dry electrolytes embedded in the jacket of poorer conducting material, either solid or powdered, the rods being provided at their opposite ends with suitable terminals for making connection with an electric circuit. In the last described form the rods are preferably arranged in a circle and either in contact with each other or not, as desired, the whole thus constituting a notched or an interrupted tube; but the rods may be arranged on the lines of a rectangle or other shape, if preferred. The devices by means of which I accomplish the described result are clearly shown in the accompanying drawings, in which—

Figure 1 shows a tube having terminal connections at its opposite ends. Fig. 2 shows the tube developed into a plane, each confronting pair of terminals being connected to a separate converter-secondary. Fig. 3 is a similar view showing each confronting pair of terminals connected with a separate ballast. Fig. 4 is a perspective of an electrolytic tube having longitudinal notches. Fig. 5 is a similar view of a tube made of segments composed of mixtures of dry electrolytes separated by segments of poorer conducting material. Fig. 6 is a perspective of an electrolytic tube made up of rods composed of mixtures of dry electrolytes embedded in a jacket of a poorer conducting material, and Fig. 7 is a similar view of a tube in which the conducting-rods are embedded in a jacketing material in the form of a powder held in place by an inner and an outer ring.

Referring to Fig. 1, the character 1 indicates a tube composed of a mixture of dry electrolytes, such as magnesia and alumina, the same being supplied with terminals 2, 3, 4, 5, 6, 7, and 8 at one end and with corresponding terminals 9, 10, 11, 12, 13, 14, and 15 at the opposite end. The terminals at the opposite ends of the tube are arranged in confronting pairs. The resistance, and consequently the voltage drop, will, therefore, with a given current be less from any given terminal to its direct opposite than to any other terminal. If now each confronting pair of terminals be connected to a separate converter-secondary or to a separate ballast resistance, the conditions of Figs. 2 and 3 are produced, the tube being developed into a plane by rolling. In the arrangement illustrated in these figures the current of any secondary or through any ballast, should it tend to stray from the straight line across to the opposite terminal, must traverse a longer path, and thus, geometrically speaking, a path of greater resistance. In Figs. 2 and 3, should the current from the terminal 2 tend to enter terminal 10 instead of terminal 9, where it belongs, the voltage at 9 rises and that at 10 falls in proportion to the stray current, thereby tending to maintain even distribution from all the terminals. To accomplish the same result, I may construct the electrolytic tube as illustrated in Fig. 4, in which longitudinal notches 16 16 separate or partially separate the adjacent current-paths. Still another means for accomplishing the same end consists in making the tube of segments 17 17, composed of a mixture, say, of magnesia and alumina separated by segments 18 18 of pure magnesia or pure alumina alone. The unmixed electrolytes being poorer conductors than the mixtures, the currents will pass along the better conducting segments, as will be readily understood.

In Fig. 6 I show rods 20 20, of mixed electrolytes, embedded in a jacket 19, of relatively poor conducting material. In Fig. 7 this idea is carried forward a step by showing the jacket 19 as a powder of poorly conducting material held in place by tubes 21 and 22. In this figure the rods may be composed of the above-described mixture of dry electrolytes surrounded by magnesia-powder, and the tubes may be of pure magnesia. Outside the tube 22 I may place a block or jacket 23, of calcium oxid, as being one of the best heat-insulators known, or I may use some other inert heat-resisting material in place of calcia.

The advantages of the general form of furnace illustrated in Figs. 6 and 7 may be utilized in connection with carbon rods as substitutes for the electrolytic rods 20 20. The carbon rods would then be conductors of the electric current embedded in inert heat-resisting material. In general the functions of a furnace of this sort would be the same as those of the furnace described above; but the carbon rod would be adapted to take current without preliminary heating. It will be understood that in every case a jacket is necessary, as was fully set forth in my patent already referred to.

I claim as my invention—

1. An electric furnace, consisting of a tube composed of a mixture of dry electrolytes constituting the conducting portion of the furnace, the said tube being provided with confronting electric-circuit terminals arranged in pairs at opposite ends of the tube, and the said pairs of terminals being symmetrically spaced.

2. An electric furnace consisting of a tube composed of a mixture of dry electrolytes constituting the conducting portion of the furnace, and provided with means for preventing the uneven distribution of current traversing the tube when in use.

3. An electric furnace consisting of a tube composed of a mixture of dry electrolytes constituting the conducting portion of the furnace, the said tube being provided with separated or partially-separated structural elements forming paths for the electric current.

4. An electric furnace, consisting of an interrupted tube composed of a mixture of dry electrolytes, the tube elements constituting the conducting portion of the furnace and being surrounded wholly or in part by poorer conducting material.

5. An electric furnace, consisting of an interrupted tube composed of a mixture of dry electrolytes, the tube elements constituting the conducting portion of the furnace and being surrounded wholly or in part by poorer conducting material in powdered form.

6. An electric furnace, consisting of an interrupted tube of material which is conducting at the temperature at which the furnace is to be used, the elements of the tube being wholly or partially surrounded by material of lower conductivity.

7. An electric furnace, consisting of an interrupted tube of material which is conducting at the temperature at which the furnace is to be used, the elements of the tube being wholly or partially surrounded by material of lower conductivity in powdered form.

8. An electric furnace, consisting of a tube composed of a mixture of dry electrolytes and provided with means for preventing the uneven distribution of current in the body of the furnace when in use, in combination with a jacket of poorer conducting material.

9. An electric furnace, consisting of an interrupted tube composed of material which is conducting at the temperature at which the furnace is to be used, the elements of the tube being surrounded by powdered material of lower conductivity, the powdered material being held in place by tubes of poorly-conducting material.

10. An electric furnace, consisting of an interrupted tube composed of material which is conducting at the temperature at which the furnace is to be used, the elements of the tube being surrounded by powdered material of lower conductivity, the powdered material being held in place by tubes of poorly-conducting material, and the outer ring being surrounded by a jacket of inert heat-resisting material.

Signed at New York, in the county of New York and State of New York, this 19th day of November, A. D. 1901.

HENRY NOEL POTTER.

Witnesses:
GEORGE H. STOCKBRIDGE.
WM. H. CAPEL.